(12) United States Patent
Kickbusch et al.

(10) Patent No.: US 8,589,057 B2
(45) Date of Patent: Nov. 19, 2013

(54) METHOD AND APPARATUS FOR AUTOMATIC SELECTION OF ALTERNATIVE ROUTING THROUGH CONGESTED AREAS USING CONGESTION PREDICTION METRICS

(75) Inventors: Joel Kickbusch, Rockledge, FL (US); Joseph Wesley Philp, Indialantic, FL (US); Mitchell Scott Wills, Melbourne, FL (US)

(73) Assignee: General Electric Company, Schenectady, NY (US)

( * ) Notice: Subject to any disclaimer, the term of this patent is extended or adjusted under 35 U.S.C. 154(b) by 0 days.

(21) Appl. No.: 12/907,677

(22) Filed: Oct. 19, 2010

(65) Prior Publication Data

US 2011/0035138 A1    Feb. 10, 2011

Related U.S. Application Data

(63) Continuation of application No. 11/342,857, filed on Jan. 31, 2006, now abandoned, which is a continuation-in-part of application No. 10/785,059, filed on Feb. 25, 2004, now abandoned.

(60) Provisional application No. 60/449,849, filed on Feb. 27, 2003.

(51) Int. Cl.
| | |
|---|---|
| *G05D 1/00* | (2006.01) |
| *G06F 17/00* | (2006.01) |
| *G08G 1/01* | (2006.01) |
| *B61L 25/02* | (2006.01) |

(52) U.S. Cl.
USPC .......... 701/117; 701/19; 246/167 R; 340/989

(58) Field of Classification Search
USPC ............ 701/19, 118, 117, 414, 20, 400, 533; 246/167 R, 2 R; 340/990, 989, 994, 340/995.19
See application file for complete search history.

(56) References Cited

U.S. PATENT DOCUMENTS

| | | | |
|---|---|---|---|
| 3,575,594 A | 4/1971 | Elcan | |
| 3,734,433 A | 5/1973 | Metzner | |

(Continued)

FOREIGN PATENT DOCUMENTS

| | | |
|---|---|---|
| CA | 2057039 | 12/1990 |
| CA | 2066739 | 2/1992 |

(Continued)

OTHER PUBLICATIONS

Krueger, H. "Parametric modeling in rail capacity planning" Simulation Conference Proceedings, 1999 Winter, vol. 2, p. 1194-1200.*

(Continued)

*Primary Examiner* — Christine Behncke
(74) *Attorney, Agent, or Firm* — GE Global Patent Operation; John A. Kramer

(57) ABSTRACT

A scheduling system and method for moving plural objects through a multipath system described as a freight railway scheduling system. The scheduling system utilizes a cost reactive resource scheduler to minimize resource exception while at the same time minimizing the global costs associated with the solution. The achievable movement plan can be used to assist in the control of, or to automatically control, the movement of trains through the system. Alternative routes through congested areas are automatically selected using congestion prediction metrics.

7 Claims, 2 Drawing Sheets

(56) References Cited

U.S. PATENT DOCUMENTS

| | | | |
|---|---|---|---|
| 3,794,834 A | 2/1974 | Auer, Jr. et al. | |
| 3,839,964 A | 10/1974 | Gayot | |
| 3,895,584 A | 7/1975 | Paddison | |
| 4,099,707 A | 7/1978 | Anderson | |
| 4,122,523 A | 10/1978 | Morse et al. | |
| 4,361,300 A | 11/1982 | Rush | |
| 4,669,047 A | 5/1987 | Chucta | |
| 4,791,871 A | 12/1988 | Mowll | |
| 4,843,575 A | 6/1989 | Crane | |
| 4,883,245 A | 11/1989 | Erickson, Jr. | |
| 4,926,343 A | 5/1990 | Tsuruta et al. | |
| 4,937,743 A | 6/1990 | Rassman et al. | |
| 5,038,290 A | 8/1991 | Minami | |
| 5,063,506 A | 11/1991 | Brockwell et al. | |
| 5,177,684 A | 1/1993 | Harker et al. | |
| 5,222,192 A | 6/1993 | Shaefer | |
| 5,229,948 A | 7/1993 | Wei et al. | |
| 5,237,497 A | 8/1993 | Sitarski | |
| 5,265,006 A | 11/1993 | Asthana et al. | |
| 5,289,563 A | 2/1994 | Nomoto et al. | |
| 5,311,438 A | 5/1994 | Sellers et al. | |
| 5,331,545 A | 7/1994 | Yajima et al. | |
| 5,335,180 A | 8/1994 | Takahashi et al. | |
| 5,365,516 A | 11/1994 | Jandrell | |
| 5,390,880 A | 2/1995 | Fukawa et al. | |
| 5,420,883 A | 5/1995 | Swensen et al. | |
| 5,437,422 A | 8/1995 | Newman | |
| 5,463,552 A | 10/1995 | Wilson et al. | |
| 5,467,268 A | 11/1995 | Sisley et al. | |
| 5,487,516 A | 1/1996 | Murata et al. | |
| 5,541,848 A | 7/1996 | McCormack et al. | |
| 5,623,413 A | 4/1997 | Matheson et al. | |
| 5,745,735 A | 4/1998 | Cohn et al. | |
| 5,794,172 A | 8/1998 | Matheson et al. | |
| 5,825,660 A | 10/1998 | Cagan et al. | |
| 5,828,979 A | 10/1998 | Polivka et al. | |
| 5,850,617 A | 12/1998 | Libby | |
| 6,032,905 A | 3/2000 | Haynie | |
| 6,115,700 A | 9/2000 | Ferkinhoff et al. | |
| 6,125,311 A | 9/2000 | Lo | |
| 6,144,901 A | 11/2000 | Nickles et al. | |
| 6,154,735 A | 11/2000 | Crone | |
| 6,240,364 B1 * | 5/2001 | Kerner et al. | 701/210 |
| 6,250,590 B1 | 6/2001 | Hofestadt et al. | |
| 6,317,686 B1 * | 11/2001 | Ran | 701/210 |
| 6,351,697 B1 | 2/2002 | Baker | |
| 6,377,877 B1 | 4/2002 | Doner | |
| 6,393,362 B1 | 5/2002 | Burns | |
| 6,405,186 B1 | 6/2002 | Fabre et al. | |
| 6,427,114 B1 * | 7/2002 | Olsson | 701/117 |
| 6,459,965 B1 | 10/2002 | Polivka et al. | |
| 6,587,764 B2 | 7/2003 | Nickles et al. | |
| 6,611,750 B2 | 8/2003 | MacPhail et al. | |
| 6,615,130 B2 * | 9/2003 | Myr | 701/117 |
| 6,637,703 B2 | 10/2003 | Matheson et al. | |
| 6,654,682 B2 | 11/2003 | Kane et al. | |
| 6,766,228 B2 | 7/2004 | Chirescu | |
| 6,789,005 B2 | 9/2004 | Hawthorne | |
| 6,799,097 B2 | 9/2004 | Villarreal Antelo et al. | |
| 6,799,100 B2 | 9/2004 | Burns | |
| 6,853,889 B2 | 2/2005 | Cole | |
| 6,856,865 B2 | 2/2005 | Hawthorne | |
| 7,006,796 B1 | 2/2006 | Hofmann et al. | |
| 7,092,894 B1 * | 8/2006 | Crone | 705/7.26 |
| 7,219,067 B1 * | 5/2007 | McMullen et al. | 705/4 |
| 7,386,391 B2 * | 6/2008 | Morariu et al. | 701/117 |
| 7,428,452 B2 | 9/2008 | Howlett et al. | |
| 2003/0105561 A1 | 6/2003 | Nickles et al. | |
| 2003/0183729 A1 | 10/2003 | Root et al. | |
| 2004/0010432 A1 | 1/2004 | Matheson et al. | |
| 2004/0034556 A1 | 2/2004 | Matheson et al. | |
| 2004/0093196 A1 | 5/2004 | Hawthorne | |
| 2004/0093245 A1 | 5/2004 | Matheson et al. | |
| 2004/0267415 A1 | 12/2004 | Lacote et al. | |
| 2005/0107890 A1 | 5/2005 | Minkowitz et al. | |
| 2005/0192720 A1 | 9/2005 | Christie et al. | |
| 2006/0074544 A1 | 4/2006 | Morariu et al. | |

FOREIGN PATENT DOCUMENTS

| | | |
|---|---|---|
| CA | 2046984 | 6/1992 |
| CA | 2112302 | 6/1994 |
| CA | 2158355 | 10/1994 |
| EP | 0108363 | 5/1984 |
| EP | 0193207 | 9/1986 |
| EP | 0341826 | 11/1989 |
| EP | 0554983 | 8/1993 |
| FR | 2692542 | 12/1993 |
| GB | 1321053 | 6/1973 |
| GB | 1321054 | 6/1973 |
| JP | 3213459 | 9/1991 |
| WO | 90/03622 | 4/1990 |
| WO | 93/15946 | 8/1993 |

OTHER PUBLICATIONS

Crone et al., "Distributed Intelligent Network Management for the SDI Ground Network," IEEE, 1991, p. 722-726, MILCOM 91.

Ghedira, "Distributed Simulated Re-Annealing for Dynamic Constraint Satisfaction Problems," IEEE, 1994, p. 601-607.

Hasselfield, "An Automated Method for Least Cost Distribution Planning," IEEE Transactions on Power Delivery, vol. 5, No. 2, Apr. 1990, p. 1188-1194.

Herault et al., "Figure-Ground Discrimination: A Combinatorial Optimization Approach," IEEE Transactions on Pattern Analysis & machine Intelligence, vol. 15, No. 9, Sep. 1993, 899-914.

Igarashi, "An Estimation of Parameters in an Energy Function Used in a Simulated Annealing Method," IEEE, 1992, p. IV-180-IV-485.

Komaya, "A New Simulation Method and Its Application to Knowledge-Based Systems for Railway Scheduling," May 1991, p. 59-66.

Puget, "Object Oriented Constraint Programming for Transportation Problems," IEEE, 1993, p. 1-13.

Sasaki et al., "Development of a New Electronic Blocking System," QR of RTRI, vol. 30, No. 4, Nov. 1989, p. 198-201.

Scherer et al., "Combinatorial Optimization for Spacecraft Scheduling," 1992 IEEE, International Conference on Tolls with AI, Nov. 1992, p. 120-126.

Watanabe et al., "Moving Block System with Continuous Train Detection Utilizing Train Shunting Impedance of Track Circuit," QR of RTRI, vol. 30, No. 4, Nov. 1989, p. 190-197.

* cited by examiner

METHOD AND APPARATUS FOR AUTOMATIC SELECTION OF ALTERNATIVE ROUTING THROUGH CONGESTED AREAS USING CONGESTION PREDICTION METRICS

RELATED APPLICATIONS

This application is a continuation of application Ser. No. 11/342,857 filed on Jan. 31, 2006, which is a continuation in part of application Ser. No. 10/785,059 filed Feb. 25, 2004, claiming the benefit of U.S. Provisional Application 60/449, 849 filed on Feb. 27, 2003.

This application is also one of the below listed applications being concurrently filed:

U.S. application Ser. No. 11/342,856, entitled "Scheduler and Method for Managing Unpredictable Local Trains";

U.S. application Ser. No. 11/342,855, entitled "Method And Apparatus For Optimizing Maintenance Of Right Of Way";

U.S. application Ser. No. 11/342,853, entitled "Method and Apparatus for Coordinating Railway Line-Of-Road and Yard Planners";

U.S. application Ser. No. 11/342,875, entitled "Method and Apparatus for Selectively Disabling Train Location Reports";

U.S. application Ser. No. 11/342,854, entitled "Method And Apparatus For Automatic Selection Of Train Activity Locations";

U.S. application Ser. No. 11/342,857, entitled "Method And Apparatus For Congestion Management";

U.S. application Ser. No. 11/342,816, entitled "Method and Apparatus for Estimating Train Location".

The disclosure of each of the above referenced applications including those concurrently filed herewith is hereby incorporated herein by reference.

BACKGROUND OF THE INVENTION

The present invention relates to the scheduling of movement of plural units through a complex movement defining system, and in the embodiment disclosed, to the scheduling of the movement of freight trains over a railroad system, and specifically to the alternating routing of trains through congested areas.

Systems and methods for scheduling the movement of trains over a rail network have been described in U.S. Pat. Nos. 6,154,735, 5,794,172, and 5,623,413, the disclosure of which is hereby incorporated by reference.

As disclosed in the referenced patents and applications, the complete disclosure of which is hereby incorporated herein by reference, railroads consist of three primary components (1) a rail infrastructure, including track, switches, a communications system and a control system; (2) rolling stock, including locomotives and cars; and, (3) personnel (or crew) that operate and maintain the railway. Generally, each of these components are employed by the use of a high level schedule which assigns people, locomotives, and cars to the various sections of track and allows them to move over that track in a manner that avoids collisions and permits the railway system to deliver goods to various destinations.

As disclosed in the referenced applications, a precision control system includes the use of an optimizing scheduler that will schedule all aspects of the rail system, taking into account the laws of physics, the policies of the railroad, the work rules of the personnel, the actual contractual terms of the contracts to the various customers and any boundary conditions or constraints which govern the possible solution or schedule such as passenger traffic, hours of operation of some of the facilities, track maintenance, work rules, etc. The combination of boundary conditions together with a figure of merit for each activity will result in a schedule which maximizes some figure of merit such as overall system cost.

As disclosed in the referenced applications, and upon determinining a schedule, a movement plan may be created using the very fine grain structure necessary to actually control the movement of the train. Such fine grain structure may include assignment of personnel by name as well as the assignment of specific locomotives by number, and may include the determination of the precise time or distance over time for the movement of the trains across the rail network and all the details of train handling, power levels, curves, grades, track topography, wind and weather conditions. This movement plan may be used to guide the manual dispatching of trains and controlling of track forces, or provided to the locomotives so that it can be implemented by the engineer or automatically by switchable actuation on the locomotive.

The planning system is hierarchical in nature in which the problem is abstracted to a relatively high level for the initial optimization process, and then the resulting course solution is mapped to a less abstract lower level for further optimization. Statistical processing is used at all levels to minimize the total computational load, making the overall process computationally feasible to implement. An expert system is used as a manager over these processes, and the expert system is also the tool by which various boundary conditions and constraints for the solution set are established. The use of an expert system in this capacity permits the user to supply the rules to be placed in the solution process.

Currently, a dispatcher's view of the controlled railroad territory can be considered myopic. Dispatchers view and processes information only within their own control territories and have little or no insight into the operation of adjoining territories, or the railroad network as a whole. Current dispatch systems simply implement controls as a result of the individual dispatcher's decisions on small portions of the railroad network and the dispatchers are expected to resolve conflicts between movements of objects on the track (e.g. trains, maintenance vehicles, survey vehicles, etc.) and the available track resource limitations (e.g. limited number of tracks, tracks out of service, consideration of safety of maintenance crews near active tracks) as they occur, with little advanced insight or warning.

Congestion inevitably occurs in the routing of trains and often occurs in the same areas. Congestion is a significant problem. The routing of trains into a congested area tends to exacerbate the congestion and may result in deadlock. Because the delay in the movement of trains is subject to cost constraints including contract penalties, the tendency of dispatchers is to continue to push trains through an area as rapidly as possible, advancing their movement along the line of road whenever possible, and treating the resulting congestion as a track availability problem to be solved through the assignment of track resources to create alternative routes through the congested area. The movement planners used by dispatchers in adjacent territories are often completely independent of each other and uninformed as to the status of the tracks in adjacent territories. As a result, dispatchers in uncongested areas may continue to send trains into a congested area in the adjacent territory.

The present invention relates to the anticipation and avoidance of congestion to maximize the throughput of trains in the overall system at the expense of the movement of trains over smaller sections of track.

Congestion generally is the after-the-fact result of acts set in motion by dispatchers assisted by train movement planners, i.e., by acts taken long prior to the development of actual congestion. By the time that congestion is actually detected, other trains are enroute through the congested area and in may cases have passed the point in the system where an alternative route may have been selected.

Typically, the routing of trains through areas of expected congestion is handled by dispatchers utilizing tribal knowledge, i.e., knowledge gained through the dispatcher's personal experience and the experience of other dispatchers passed to him.

It is accordingly an object of the present invention to reduce congestion and avoid deadlock by the management of the entry of trains into a congested area.

These and many other objects and advantages of the present invention will be readily apparent to one skilled in the art to which the invention pertains from a perusal of the claims, the appended drawings, and the following detailed description of the preferred embodiments.

DETAILED DESCRIPTION

Figure 1:
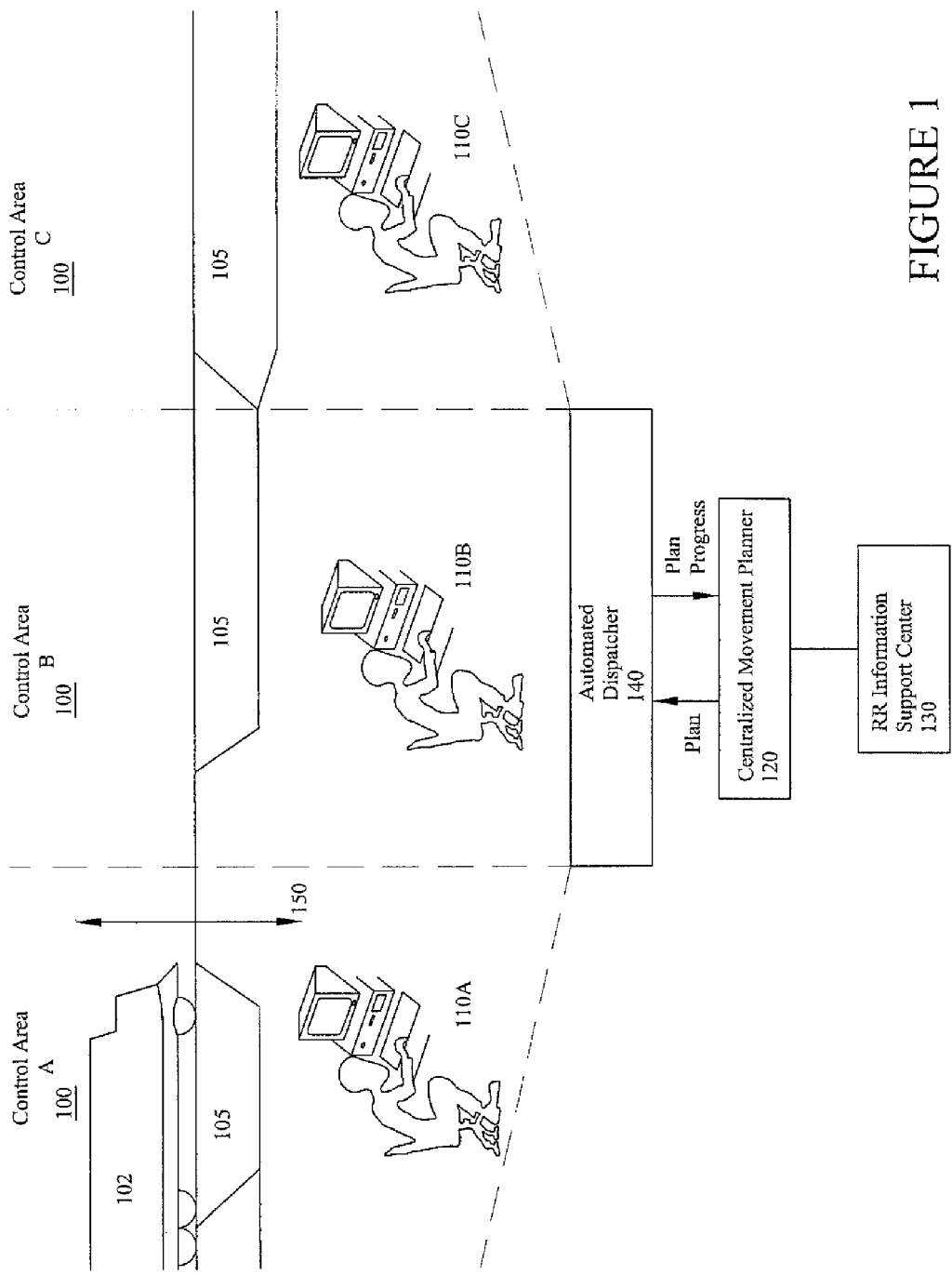
FIG. 1 is a simplified pictorial representation of one embodiment of the present invention for use with a rail network divided into control areas.

As illustrated in FIG. 1, the global rail network 105 can be divided into one or more control areas 100 (100A-100C), each of which has a dispatcher 110 (110A-110C) assigned to manage the movement of trains (102) through his respective control area 100. A centralized movement planner 120 provides a network based movement plan for the global rail network 105 based on input received from the railroad information support center 130. The railroad information support center 130 provides information related to the track resources and other information suitable to plan the use of the resources. Centralized movement planner 120 generates a movement plan for the resources in the track network 105 and provides the plan to the automated dispatcher 140. Movement planner 120 may also received updates on the execution of the movement plan from automated dispatcher 140 and can update the current movement plan. Automated dispatcher 140 provides each of the dispatchers 110 with the movement plan to manage the train resources in their respective control areas 110.

As described in the referenced applications, the automated dispatcher 140 can be implemented using computer usable medium having a computer readable code executed by special purpose or general purpose computers. The automated dispatcher 140 communicates with trains 102 on the network of track via a suitable communication link 150, such as a cellular telephone, satellite or wayside signaling.

The dispatcher issues and approves the issuance of movement authorities and track restrictions, schedule maintenance of way activities and communicates with train crews, yard managers and other railroad personnel consistent with an optimized operating plan for the railroad. While the dispatcher will rely on the movement planner to solve the complex problem of optimizing movement of trains, the dispatcher will be actively involved in entering the necessary data required to maintain an optimized plan and identify exceptions to the plan.

As disclosed in the referenced applications, enhanced planning is facilitated by automatically supplying the movement planner 120 with information from the railroad information support center 130 which associates train consist events (e.g., pickups, crew changes, engine destinations) with planned train activities that occupy track resources for the duration of a dwell time, so that maintenance of the traditional train sheet data (via electronic messaging and user data entry) is automatically reflected in the train trip specifications for use for movement planning.

From this information, and with the aid of suitable conventional traffic flow analysis algorithms desirably embedded in the movement planner 120, congestion in a particular geographic area can be identified and the dispatchers in other areas advised of the existence of the congestion and decline to push trains into the congested area. Thus, traffic flow analysis algorithms can detect and may also be used to predict the further occurrence of congestion.

The present application also is directed to the identification of areas that are prone to congestion and to take action sufficiently in advance of the predicted congestion to minimize or obviate avoid the congestion all together. In one embodiment, the maintenance of a historical database of events that have resulted in congestion may be used in anticipating congestion. For example, analysis of a historical database may identify factors which are associated with congestion. Such factors may be temporal, e.g., between 3:00 and 5:00 p.m. or seasonal, e.g., during winter months, in nature. The factors may include environmental conditions, track topography, type of train, identification of crew, or other factors which may affect the likelihood of congestion. Each factor may be assigned a metric as a function of its contribution to the occurrence of congestion. The factors may also be weighted depending on the contribution of the factor. Through statistical analysis, it may be determined for a particular route, that the planned usage of the route by its scheduled trains may cause the cumulative metric for the route to exceed a predetermined threshold indicating the likely occurrence of congestion. The congestion metrics may be used by the movement plan to schedule the trains to alternative routes in order to reduce the metric for a given route to below the predetermined threshold.

Figure 2:
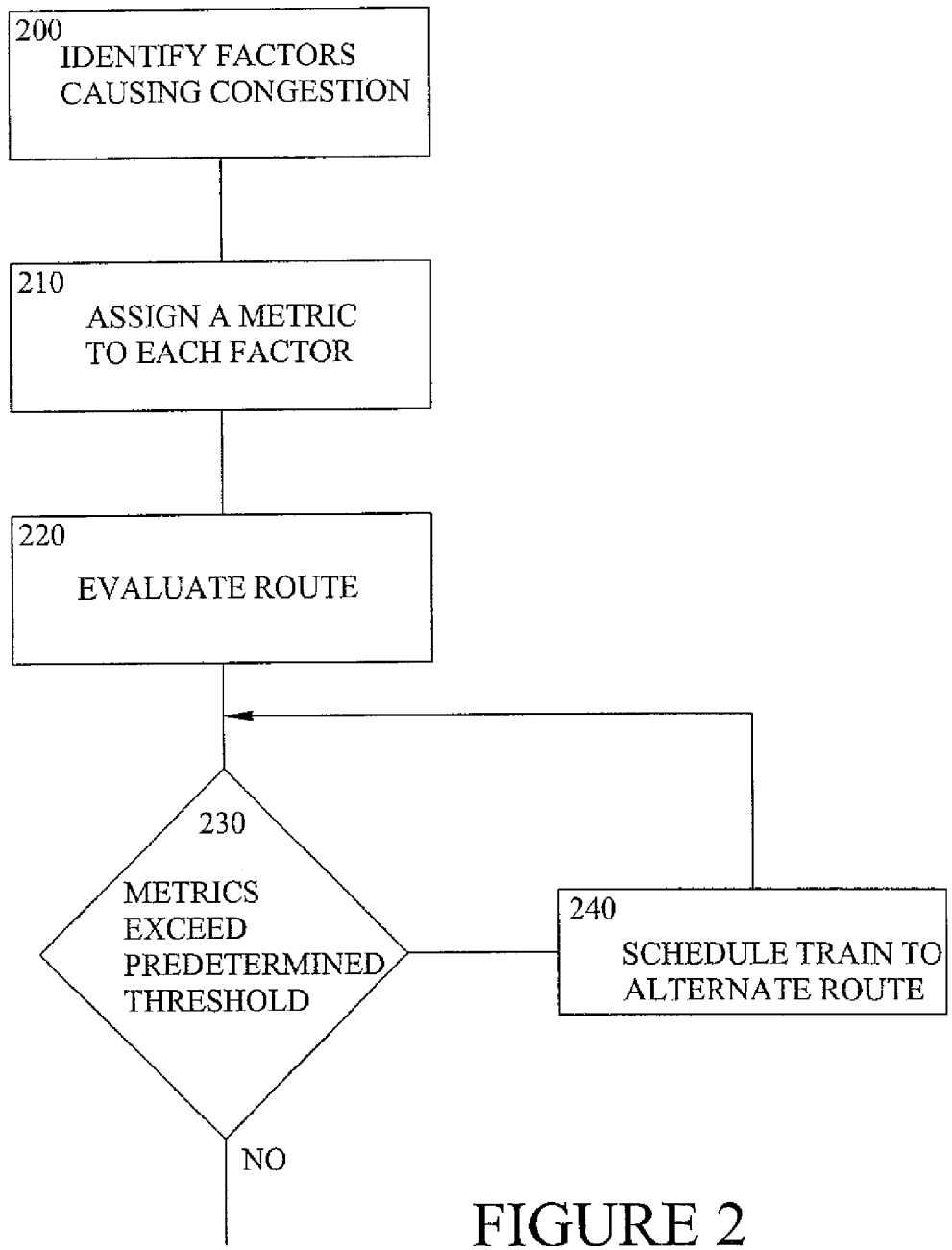
FIG. 2 is a simplified flow diagram for one embodiment of a scheduling method that predicts the occurrence of congestion over a selected route.

FIG. 2 illustrates one embodiment of the present application. A method of scheduling the movement of trains may be accomplished by predicting the occurrence of congestion due to the planned movement of the trains over a selected route. Factors are identified 200 which contribute to the congestion. The factors may be identified through the collection and analysis of the historical performance of trains over a selected route. Once the factors are identified, a metric can be assigned to each factor 210 to account for that factor's contribution to congestion. The factor may be weighted appropriately with relation to other factors, or may be linked to other factors to account for the relationship that may exist between factors. Each route can then be evaluated to determine the probability of congestion based on the planned movement of trains over the selected route. This can be accomplished by evaluating the metrics for each planned movement of a train over the selected route 220. If the cumulative metrics for a given route exceed some predetermined threshold 230, one or more of the planned movement of the trains can be rescheduled to an alternate route 240.

In another embodiment, if the cumulative metrics for a route exceed a predetermined threshold, a further evaluation can be done to determine the contribution of each planned train to the predicted congestion and the train contributing the most can be selected for rescheduling to an alternate route.

These methods of scheduling may be implemented using computer usable medium having a computer readable code executed by special purpose or general purpose computers.

Other factors that may be considered to predict congestion include train density, type of train, the identity of the particular crew controlling a train, the type of load being carried by the train, physical constraints of the train, network topography including number of crossings, availability of sidings, zone restrictions or curfews. The weighting of the factors can be based upon historical statistics and can vary as a function of other factors. For example, the weight of the train may be a factor that is weighted more heavily in those areas where the track topography factor indicates a steep incline.

The combined metric for a route need not exceed a predetermined threshold to take steps to reduce the probability of congestion. The metric for a route can be compared against a metric for the same route with alternate planning to pick the planned movement over the route that results in the lowest congestion metric. Thus, a route metric evaluation can be performed for a number of different planned movements over the route to select the planned movement resulting in the lowest probability of congestion.

Departure times may be delayed and/or safe places can be found for trains en route along the line-of-road. Deadlocks may thus be prevented and the alternate routes may remain unblocked for use by the movement planner 120 in clearing the congestion.

While the delay of trains in uncongested areas may be costly, this cost may pale in comparison to the savings achieved as a result of the improvement of traffic flow through the system as a whole.

While preferred embodiments of the present invention have been described, it is understood that the embodiments described are illustrative only and the scope of the invention is to be defined solely by the appended claims when accorded a full range of equivalence, many variations and modifications naturally occurring to those of skill in the art from a perusal hereof.

What is claimed is:

1. A method comprising:
    receiving a movement plan that schedules movements of plural rail vehicles in a track network;
    identifying factors representative of historical vehicle events that occupied track resources in the track network for one or more respective dwell times during previous movements of the rail vehicles in the track network;
    assigning metrics to the factors, the metrics representative of relative contributions of the respective factors to previous traffic congestion in the track network during the historical vehicle events;
    predicting future traffic congestion in the track network during the movements of the rail vehicles that are scheduled in the movement plan, the traffic congestion predicted by calculating a first cumulative total of the metrics assigned to the factors associated with the previous movements of the rail vehicles in the track network that are scheduled to move in the track network using the movement plan; and
    rescheduling the movements of one or more of the rail vehicles by modifying the movement plan, wherein a second cumulative total of the metrics assigned to the factors associated with the movements of the one or more of the rail vehicles that are rescheduled is less than the first cumulative total of the metrics.

2. The method of claim 1, wherein rescheduling the movements includes identifying a selected rail vehicle of the one or more rail vehicles that is associated with the metrics that contribute more to the first cumulative total than the metrics associated with one or more other rail vehicles in the first cumulative total, and modifying the movements of the selected rail vehicle.

3. The method of claim 1, wherein at least one of the factors represents an environmental condition.

4. The method of claim 1, wherein at least one of the factors represents a track topography.

5. The method of claim 1, wherein at least one of the factors represents a type of train.

6. The method of claim 1, wherein at least one of the factors represents an identification of a crew operating a train.

7. The method of claim 1, wherein at least one of the factors represents a type of load being carried by a train.

* * * * *